United States Patent
Chen et al.

(10) Patent No.: US 12,223,736 B2
(45) Date of Patent: Feb. 11, 2025

(54) PROCESSING METHOD, DEVICE AND STORAGE MEDIUM FOR REAR VIEW IMAGE

(71) Applicant: FAURECIA CLARION ELECTRONICS (XIAMEN) CO., LTD., Xiamen (CN)

(72) Inventors: Shude Chen, Xiamen (CN); Chunfu Lin, Xiamen (CN); Cailing Xu, Xiamen (CN)

(73) Assignee: FAURECIA CLARION ELECTRONICS (XIAMEN) CO., LTD., Xiamen (CN)

( * ) Notice: Subject to any disclaimer, the term of this patent is extended or adjusted under 35 U.S.C. 154(b) by 96 days.

(21) Appl. No.: 18/352,227

(22) Filed: Jul. 13, 2023

(65) Prior Publication Data
US 2024/0037957 A1  Feb. 1, 2024

(30) Foreign Application Priority Data
Jul. 29, 2022 (CN) .......................... 202210908896.8

(51) Int. Cl.
G06V 20/56 (2022.01)
G06F 3/14 (2006.01)
G06T 7/11 (2017.01)
G06T 7/64 (2017.01)

(52) U.S. Cl.
CPC ................ G06V 20/56 (2022.01); G06F 3/14 (2013.01); G06T 7/11 (2017.01); G06T 7/64 (2017.01); *G06V 2201/07* (2022.01)

(58) Field of Classification Search
CPC .. G06V 20/56; G06T 7/64; G06T 7/11; G06F 3/14
See application file for complete search history.

(56) References Cited

U.S. PATENT DOCUMENTS

2016/0263997 A1* 9/2016 Mizutani ................... B60R 1/26
2022/0041105 A1* 2/2022 Jochmann ............... B60R 11/04

* cited by examiner

*Primary Examiner* — Mishawn N. Hunter
(74) *Attorney, Agent, or Firm* — KILPATRICK TOWNSEND & STOCKTON LLP

(57) ABSTRACT

The present disclosure provides a processing method, a device and a storage medium for rear view image. The processing method includes following steps: obtaining an original rear view image; obtaining vehicle data to determine at least one basic curvature; obtaining driver information to determine at least one floating curvature; and processing the rear view image according to the at least one basic curvature and the at least one floating curvature. By performing these steps, the processing method can adjust display curvature of the rear view image according to specific driving scenario and user needs, thereby clearly and personalized displaying rear view image with suitable range and display scale on the display screen with limited area, to help the user clearly observe situations on the left, right and rear sides of the vehicle.

15 Claims, 2 Drawing Sheets

PROCESSING METHOD, DEVICE AND STORAGE MEDIUM FOR REAR VIEW IMAGE

FIELD

The present disclosure relates to an electronic rear view minor technology, in particular to a processing method for rear view image, a processing device for rear view image, and a computer-readable storage medium.

BACKGROUND

Vehicle rear view minors are generally set on the left and right sides of the vehicle head, as well as the front of the interior of the carriage, to enlarge the view range of the driver and help him/her observe the situations on the left, right and rear sides of the vehicle, in order to avoid traffic accidents. However, conventional vehicle rear view mirrors usually have large blind spots.

In order to avoid the potential safety risks caused by the blind spots of the rear view mirror, some improvement proposals of the electronic rear view minor have been proposed in this field, which capture images of the left, right and rear sides of the vehicle by a camera, and perform real-time processing and display to attain the effect that show the driver the situation of the left, right and rear sides of the vehicle, and reduce or even eliminate the blind spots in the rear view mirror. However, the development of the electronic rear view minor technology in this field is still at the initial stage with a fixed display strategy, which is prone to cause the problem of a too small display proportion of obstacles in a large-scale display mode that eliminates the blind spots of the rear view mirror, thereby affecting the observation experience of users and causing potential safety risks.

In order to overcome the defects of the existing technology, a processing technology for rear view image is urgently needed in the field, for adjusting the display curvature of rear view image according to the specific driving scenario and user needs, thereby clearly and personalized displaying rear view image with suitable range and display scale on the display screen with limited area, to help the user clearly observe situations on the left, right and rear sides of the vehicle.

SUMMARY

A brief overview of embodiments is provided below to provide a basic understanding of these aspects. The summary is not an exhaustive overview of all aspects envisaged, and is neither intended to identify the key or decisive elements of all aspects nor to attempt to define the scope of any or all aspects. The sole purpose of the summary is to present some concepts of one or more aspects in a simplified form as a prelude to the more detailed description that is presented later.

In order to overcome the defects of the existing technology, the present disclosure provides a processing method for rear view image, a processing device for rear view image and a computer-readable storage medium, used to adjust the display curvature of rear view image according to the specific driving scenario and user needs, thereby clearly and personalized displaying rear view image with suitable range and display scale on the display screen with limited area, to help the user clearly observe situations on the left, right and rear sides of the vehicle.

In some embodiments, the processing method of the above rear view image provided according to the first aspect of the disclosure includes the following steps: obtaining an original rear view image; obtaining vehicle data to determine at least one basic curvature; obtaining driver information to determine at least one floating curvature; and processing the rear view image according to the at least one basic curvature and the at least one floating curvature.

Further, in some embodiments of the present disclosure, before determining the basic curvature and/or the floating curvature, the processing method further includes following steps: dividing the rear view image into display areas according to a display position.

Further, in some embodiments of the disclosure, step of obtaining vehicle data to determine at least one basic curvature includes: obtaining vehicle data, and determining a basic curvature for each of the display areas according to the vehicle data. In addition, the step of obtaining driver information to determine at least one floating curvature includes: obtaining driver information, and determining a floating curvature for each of the display areas according to the driver information.

Further, in some embodiments of the present disclosure, the vehicle data includes at least one of gear data, steering data and speed data. In addition, the driver information includes at least one of face ID, age information and eye position data.

Further, in some embodiments of the present disclosure, the steps of obtaining vehicle data, and determining a basic curvature for each of the display areas according to the vehicle data includes: obtaining the gear data and the speed data of the vehicle; and in response to the gear data and the speed data indicating that the vehicle is in a forward gear and vehicle speed is less than a preset speed threshold, configuring a smaller first basic curvature for a near end display area next to the vehicle, and configuring a larger second basic curvature for a far end display area away from the vehicle.

Further, in some embodiments of the present disclosure, the steps of obtaining vehicle data, and determining a basic curvature for each of the display areas according to the vehicle data further includes: in response to the gear data and the speed data indicating that the vehicle is in the forward gear and the vehicle speed is greater than or equal to the preset speed threshold, configuring a third basic curvature for the near end display area, and configuring a fourth basic curvature for the far end display area, and the third basic curvature is greater than the first basic curvature, and the fourth basic curvature is greater than the second basic curvature.

Further, in some embodiments of the present disclosure, the steps of obtaining vehicle data, and determining a basic curvature for each of the display areas according to the vehicle data includes: obtaining the gear data of the vehicle; and in response to the gear data indicating that the vehicle is in a reverse gear, configuring a basic curvature that equals zero for a lower display area that faces underside of the vehicle, and configuring a fifth basic curvature that is greater than zero for a middle-upper display area that faces rear and/or upside of the vehicle.

Further, in some embodiments of the present disclosure, the steps of obtaining driver information, and determining a floating curvature for each of the display areas according to the driver information includes: obtaining the eye position data of the driver; and configuring a larger first floating curvature for a focus area corresponding to the eye position data, and configuring a smaller second floating curvature for a rest non focus area.

Further, in some embodiments of the present disclosure, the steps of obtaining driver information, and determining a floating curvature for each of the display areas according to the driver information includes: obtaining a face ID of the driver; obtaining a personalized setting parameter of floating curvature of the driver according to the face ID; and determining a third floating curvature corresponding to each of the display areas according to the personalized setting parameter.

Further, in some embodiments of the present disclosure, the steps of obtaining driver information, and determining a floating curvature for each of the display areas according to the driver information further includes: obtaining the age information of the driver according to the face ID; in response to the age of the driver being greater than or equal to a preset age threshold, determining a larger fourth floating curvature for each of the display areas; and in response to the age of the driver being less than the age threshold, determining a smaller fifth floating curvature for each of the display areas.

Further, in some embodiments of the present disclosure, the steps of processing the rear view image according to the at least one basic curvature and the at least one floating curvature includes: summing each of the basic curvatures and the corresponding floating curvature thereof to determine comprehensive curvatures; determining surface control points according to comprehensive curvatures; and processing the rear view image according to surface control points to obtain a corresponding Bezier surface image.

Further, in some embodiments of the present disclosure, the processing method further including following steps: displaying the processed rear view image on a rear view display interface.

Further, in some embodiments of the present disclosure, the rear view display interface is selected from at least one of central control display, electronic rearview mirror and mobile user terminal of the vehicle.

In addition, the processing device of the rear view image provided according to the second aspect of the present disclosure includes a memory and a processor. The processor is connected to the memory and configured to implement the processing method of the rear view image provided in the first aspect of the present disclosure. Further, in some embodiments of the present disclosure, the processing device further including: a rear view display interface, used to display a processed rear view image.

Further, in some embodiments of the present disclosure, the rear view display interface is selected from at least one of central control display, electronic rearview mirror and mobile user terminal of a vehicle.

In addition, a computer-readable storage medium, in which computer instructions are stored. When the computer instructions are executed by a processor, the processing method for rear view image provided in the first aspect of the present disclosure is implemented.

DESCRIPTION OF ATTACHED DRAWINGS

The above embodiments of the present disclosure will be better understood after reading the detailed description of the embodiments of the present disclosure in conjunction with the following figures. In the figures, components are not necessarily drawn to scale, and components having similar related features may have the same or similar reference numerals.

DETAILED DESCRIPTION OF EMBODIMENTS

Figure 1:
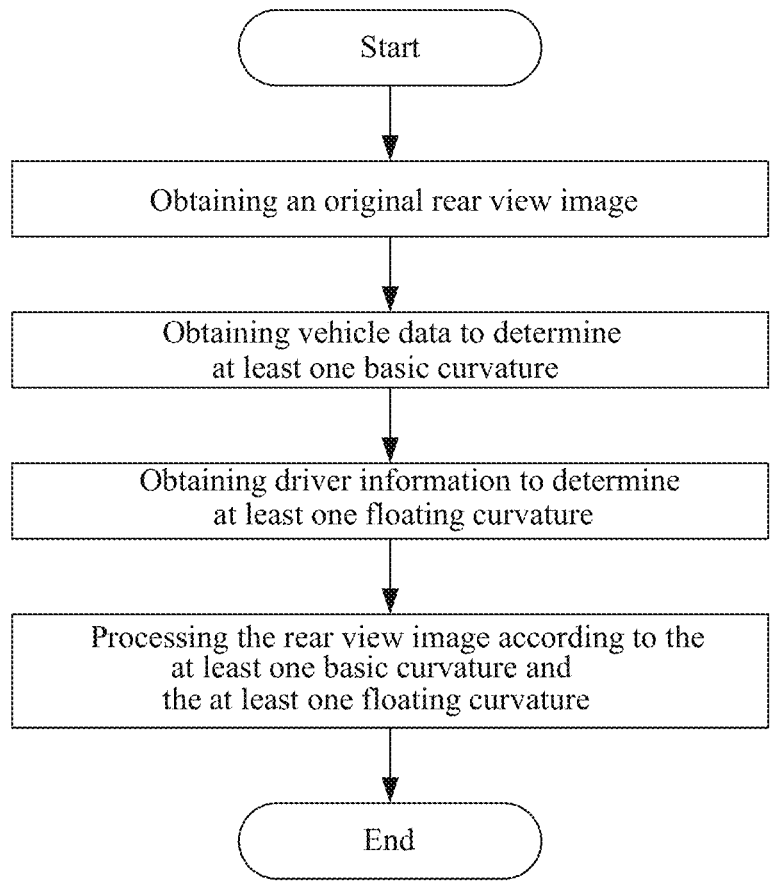
FIG. 1 shows a flow chart of a processing method for rear view image provided according to some embodiments of the present disclosure.

The implementations of the present disclosure are described below by specific embodiments. Embodiment of the present disclosure from the contents disclosed in the description. Although the description of the present disclosure is introduced together with other embodiments, it does not mean that the features of the present disclosure are limited to the embodiments. On the contrary, the purpose of introducing the present disclosure in combination with the embodiments is to cover other embodiments that may be extended based on the claims of the present disclosure. In order to provide a deep understanding of the present disclosure, the following description will contain many specific details. The present disclosure can also be implemented without using these details. In addition, in order to avoid confusion or ambiguity of the key points of the present disclosure, some specific details are omitted in the description.

In addition, the words "up", "down", "left", "right", "top", "bottom", "horizontal" and "vertical" used in the following description should be understood as the orientation shown in this paragraph and the relevant drawings. This relative term is only for convenience of explanation, and does not mean that the described device needs to be manufactured or operated in a specific direction, so it should not be understood as a limitation of the present disclosure.

It is understood that although the terms "first", "second", "third", etc. can be used here to describe various components, regions, layers and/or parts, these components, regions, layers and/or parts should not be limited by these terms, and these terms are only used to distinguish different components, regions, layers and/or parts. Therefore, a first component, area, layer and/or part discussed below can be referred to as a second component, area, layer and/or part without departing from some embodiments of the present disclosure.

As mentioned above, the development of the electronic rear view mirror technology in this field is still at the initial stage with a fixed display strategy, which is prone to cause the problem of a too small display proportion of obstacles in a large-scale display mode that eliminates the blind spots of the rear view mirror, thereby affecting the observation experience of users and causing potential safety risks. In order to overcome the defects of the existing technology, the present disclosure provides a processing method for rear view image, a processing device for rear view image and a computer-readable storage medium, which can adjust the display curvature of rear view image according to the specific driving scenario and user needs, thereby clearly and personalized displaying rear view image with suitable range and display scale on the display screen with limited area, to help the user clearly observe situations on the left, right and rear sides of the vehicle.

In some non-limiting embodiments, the processing method for rear view image provided in the embodiments of the present disclosure can be implemented through the processing device for rear view image provided in the embodiments of the present disclosure. In one embodiment, the processing device is configured with a memory and a processor. The memory includes, but is not limited to the computer-readable storage medium provided in the embodiments of the present disclosure, in which computer instructions are stored. The processor is connected to the memory and is configured to execute the computer instructions stored on the memory to implement the processing method for rear view image provided in the embodiments of the present disclosure.

The working principle of the above processing device will be described below in conjunction with some embodiments of processing methods. The embodiments of these processing methods only provide some non-limiting implementations of the present disclosure, which is intended to clearly display the main idea of the present disclosure, and provide some specific proposals that are convenient for the public to implement, rather than limiting all functions or all working modes of the processing device. Similarly, the processing device is only a non-limiting embodiment provided by the present disclosure, and does not limit the implementation subject to each step in these processing methods.

Figure 2:
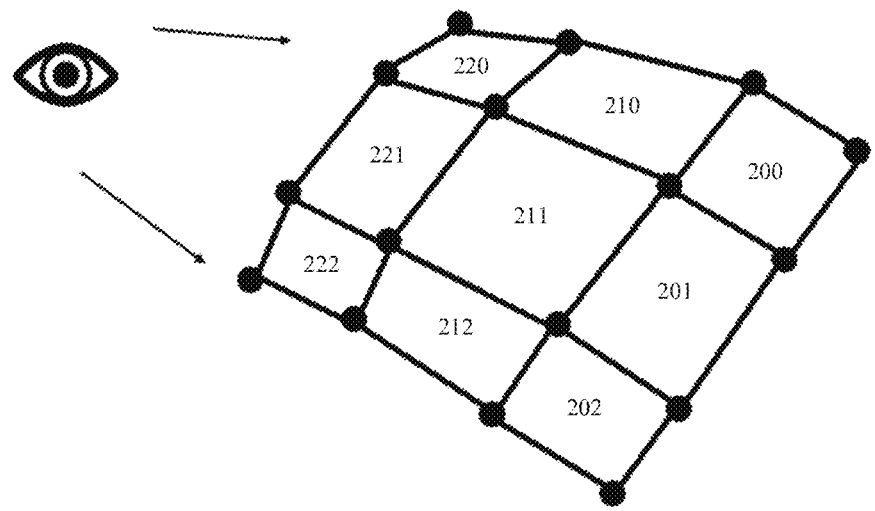
FIG. 2 shows a schematic diagram of dividing display areas provided according to some embodiments of the present disclosure.

Please refer to FIG. 1 and FIG. 2 in conjunction. FIG. 1 shows a flow chart of a processing method for rear view image provided according to some embodiments of the present disclosure. FIG. 2 shows a schematic diagram of dividing display areas provided according to some embodiments of the present disclosure.

As shown in FIG. 1, in the process of a rear view image, the processing device can first obtain an original rear view image, vehicle data and driver information through its communication connection with a vehicle machine system.

In some embodiments, the above original rear view image can be photographed by at least one camera on the left, right and rear sides of the vehicle. The at least one camera can be a specific camera for the electronic rear view mirror device, or a shared camera with the automatic driving system, reversing aid system or 360 degree panoramic camera system. The processing device can carry out pre-processing operations such as clipping, stitching, correction, etc. on the collected original image according to the photographed position of each camera, to obtain the original rear view image with zero curvature. The specific pre-processing proposal does not relate to the embodiments of the present application, and will not be described herein.

In addition, in some embodiments, the above vehicle data can include at least one of gear data, steering data and speed data. Please refer to FIG. 2. In the process of determining a basic curvature B, the processing device can first divide the complete rear view image into display areas 200~222 according to display position, and then allocate a corresponding basic curvature Bi for each display area 200~222 according to the obtained vehicle data.

For example, for a low speed forward display mode, the processing device can obtain the gear data and the speed data of the vehicle through wired and/or wireless communication methods, such as CAN bus and Bluetooth communication module of the vehicle. In response to the determination result that the gear data indicates the vehicle is in a forward gear and the speed data indicates the current vehicle speed is less than a preset speed threshold (e. g. 30, 20, 10 or 5 km/h), the processing device can determine that the vehicle is in a low speed mode, thereby configuring a zero basic curvature B0=0 for the display areas 200, 201, 202 of the vehicle body, configuring a smaller first basic curvature B1 for the near end display areas 200, 201, 202 next to the vehicle, and configuring a larger second basic curvature B2 for the far end display area 220, 221, 222 away from the vehicle. At this time, the curvature B2 of the far end area >the curvature B1 of the near end area >the curvature B0 of the car body area. By combining the gear data, the speed data and the display position to configure corresponding basic curvature Bi for each display area 200~222, the present disclosure can effectively reduce image distortion in the car body area by the zero basic curvature B0, appropriately enlarge the view range and maintain a smaller distortion with a smaller basic curvature B1, and achieve larger view range displaying in the low-risk far end areas with a larger basic curvature B2, thereby clearly and personalized displaying the rear view image with suitable range and display scale on the display screen with limited area, preventing the excessive image distortion from affecting the determination of the driver, and helping the user clearly observe situations on the left, right and rear sides of the vehicle.

For another example, for a high speed forward display mode, the processing device can obtain the gear data and the speed data of the vehicle through wired and/or wireless communication methods, such as CAN bus and Bluetooth communication module of the vehicle. In response to the determination result that the gear data indicates the vehicle is in the forward gear, and the speed data indicates the current vehicle speed is greater than or equal to the preset speed threshold (e. g. 60, 80, 100 or 120 km/h), the processing device can determine that the vehicle is in a high speed mode, thereby configuring a zero basic curvature B0=0 for the display areas 200, 201, 202 of the vehicle body, and appropriately increasing the first basic curvature B1 and the second basic curvature B2 based on the low speed display mode to enlarge the display range of view in the electronic rear view mirror. In one embodiment, in response to the determination result that the vehicle is currently in the high speed mode, the processing device can configure a third basic curvature B3 (B3>B1) for the near end display areas 200, 201, 202 next to the vehicle and configure the fourth basic curvature B4 (B4>B2) for the far end display areas 220, 221, 222 away from the vehicle. Further, since the probability of obstacles at the near end is greatly reduced in the scenario of high speed driving, the accident risk of the near end display areas 200, 201, 202 is thereby greatly reduced. The basic curvature increment (B3-B1) thereof can be greater than the basic curvature increment (B4-B2) of the far end display areas 220, 221, 222, thereby prevent the far end distortion from being too serious while ensuring the far end view range.

For another example, for reversing display mode, the processing device can obtain the gear data of the vehicle through wired and/or wireless communication methods, such as CAN bus and Bluetooth communication module of the vehicle. In response to the determination result that the gear data indicates the vehicle is in a reverse gear (e. g. R gear), the processing device can determine that the vehicle is currently in a reverse mode, thereby configuring zero basic curvature B0=0 for the lower display areas 202, 212, 222 that faces underside of the vehicle, to avoid image distortion in the wheel area that is most prone to collision accidents, and display the rear view image of the wheel area at the maximum display scale. In addition, the processing device can also configure the fifth basic curvature B5 that is greater than zero for the middle-upper display areas 201,

211, 221, 200, 210, 220 that faces the rear and/or upside of the vehicle, to appropriately enlarge the view range of the rear view mirror to reduce and eliminate the blind spots around the vehicle.

Further, as shown in FIG. 1, after obtaining the vehicle data and determining the basic curvature Bi of each display area, the processing device can also obtain driver information to determine at least one floating curvature Fi.

In one embodiment, the driver information includes at least one of face ID, age information and eye position data. For the 3×3 dividing manner shown in FIG. 2, the processing device can determine a floating curvature Fi for each display area according to the obtained driver information.

For example, in the process of determining the floating curvature Fi, the processing device can obtain the eye position data of the driver through the driver monitoring system (DMS) of the vehicle, and determine the corresponding focus area (e. g. near end area 211) according to the eye position data. Afterwards, the processing device can dynamically configure a larger first floating curvature F1 for the focus area 211 corresponding to the eye position data to enlarge the view range of the focus area 211, and configure a smaller second floating curvature F2 for the rest non focus area to maintain the normal display of these areas.

For another example, in the process of determining the floating curvature Fi, the processing device can also obtain the face recognition data (face ID) of the driver through the driver monitoring system (DMS) of the vehicle, and retrieve and obtain personalized setting parameters, such as floating curvature, focus view range and weighted average coefficient of both, which is corresponding to the facial ID, at the vehicle end and/or the cloud server of the Internet of Vehicles (IOV). Herein, the personalized setting parameters of the floating curvature can be manually set by the user, automatically recommended by an artificial intelligence (AI) model according to the historical setting parameters of the user, or automatically recommended by the AI model based on the user classification performed according to the multidimensional user data of the driver. Afterwards, the processing device can determine the corresponding third floating curvature F3 for each display area according to the obtained personalized setting parameters.

Further, in the process of determining the floating curvature Fi, the processing device can also retrieve and obtain the age information corresponding to the facial ID through the vehicle end and/or the cloud server of the Internet of Vehicles (IOV). In response to the determination result that the age of the driver is greater than or equal to a preset age threshold (e. g. 55,60 or 65 years old, etc.), the processing device can further allocate a larger fourth floating curvature F4 for each display area 200~222, and gain more emergency response time for elder users by displaying a larger view range. On the contrary, in response to the determination result that the age of the driver is less than the age threshold, the processing device can determine a smaller fifth floating curvature F5 for each display area 200~222, thereby clearly display obstacles such as adjacent vehicles and pedestrians, in the rear view image with a larger display scale.

Please continue to refer to FIG. 1. After determining the at least one basic curvature Bi and the at least one floating curvature Fi, the processing device can further process the original rear view image according to the at least one basic curvature Bi and at least one floating curvature Fi, to dynamically determine a rear view image with suitable range and suitable display scale.

Figure 3:
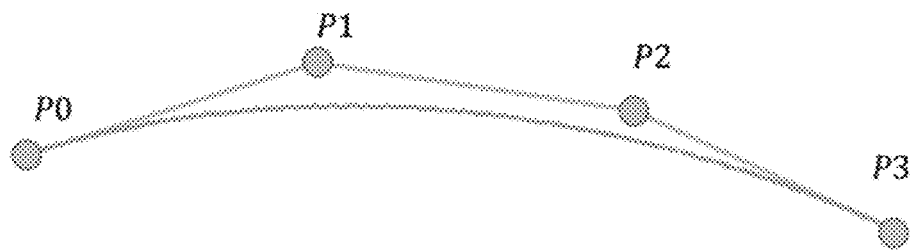
FIG. 3 shows a schematic diagram of processing rear view image provided according to some embodiments of the present disclosure.

Please refer to FIG. 3 for details. FIG. 3 shows a schematic diagram of processing rear view image provided according to some embodiments of the present disclosure.

As shown in FIG. 3, in the process of processing the rear view image, the processing device can first sum the basic curvatures Bi and their corresponding floating curvatures Fi to determine comprehensive curvatures Qi, that is, Qi=Bi+Σji, and j∈ {eye position weighting, user-defined weighting, age weighting}. Afterwards, the processing device can determine surface control points Pi according to comprehensive curvatures Qi, that is $$P_i = \begin{cases} P_i, i = 0, n \\ Q_i * P_{i-1} + \lambda_i, i = 1, 2, \ldots \frac{n}{2} \\ Q_i * P_{i+1} + \lambda_i, i = n-1, \ldots, \frac{n}{2}-1 \end{cases}$$

and $\lambda_i$ is the adjustment coefficient generated by the surface control points of each area.

Further $\lambda_i$ afterwards, the processing device can process the rear view image according to the at least one surface control point Pi to obtain a corresponding Bezier surface image, that is $$P(t) = \sum_{i=0}^{n} P_i B_{i,n}(t), t \in [0, 1]$$

$$B_{i,n}(t) = C_n^i t^i (1-t)^{n-i}, i = 0, 1, \ldots n$$

and C is the indicator of mathematical permutation and combination.

Further, after determining the Bezier surface image, the processing device can also transmit the processed rear view image to mobile user terminals, such as the central control display and electronic rear view mirror of the vehicle, the user mobile phone, tablet computer, and/or other rear view display interfaces, thereby clearly and personalized displaying the rear view image with suitable range and display scale on the display screen with limited area, to help the user clearly observe situations on the left, right and rear sides of the vehicle.

In summary, the processing method for rear view image, the processing device for rear view image, and the computer-readable storage medium provided by the present disclosure can use software algorithms to simulate the optical curvature rear view mirror, thereby providing a view change function of a variety of scenarios with a high degree of freedom. Comparing with the existing ordinary electronic rear view minor, the present disclosure can dynamically adjust the curvature of each area of the display screen with limited area, thereby clearly and personalized displaying the rear view image with suitable range and display scale on the display screen, to help the user clearly observe situations on the left, right and rear sides of the vehicle.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein.

In some embodiments, signals and data can be represented using any of a variety of different technologies and techniques. For example, the data, instructions, commands, information, signals, bits, symbols and chips cited throughout the above description may be represented by voltage, current, electromagnetic waves, magnetic fields or magnetic particles, optical fields or optical particles, or any combination thereof.

In some embodiments, various illustrative logic blocks, modules, circuits, and algorithm steps described in the embodiments disclosed herein can be implemented as electronic hardware, computer software, or a combination of both. In order to clearly explain the interchangeability of hardware and software, various illustrative components, blocks, modules, circuits, and steps are generally described above in the form of their functionality. Whether such functionality is implemented as hardware or software depends on the specific application and design constraints imposed on the overall system. Technicians can implement the described functionality in different ways for each specific application, but such implementation decisions should not be regarded as leading to departure from the scope of the disclosure.

Although the processing device described in the above embodiments can be implemented through a combination of software and hardware. However, it can be understood that the processing device can also be implemented separately in software or hardware. For hardware implementation, the processing device can be implemented in one or more application specific integrated circuits (ASICs), digital signal processors (DSPs), programmable logic devices (PLDs), field programmable gate arrays (FPGAs), processors, controllers, microcontrollers, microprocessors, other electronic devices used to perform the above functions, or a selected combination of the above devices. For software implementation, the processing device can be implemented through independent software modules such as procedures and functions running on a universal chip, and each module performs one or more of the functions and operations described in this article.

The various illustrative logic modules and circuits described in connection with the embodiments disclosed herein can be realized or executed by general-purpose processors, digital signal processors (DSPs), application specific integrated circuits (ASICs), field programmable gate arrays (FPGAs) or other programmable logic devices, discrete gate or transistor logic, discrete hardware components or any combination thereof designed to perform the functions described herein. The general processor can be a microprocessor, but in the alternative, the processor can be any conventional processor, controller, microcontroller or state machine. The processor can also be implemented as a combination of computing devices, such as a combination of DSP and microprocessors, microprocessors, one or more microprocessors cooperating with the DSP core or any other such configuration.

The previous description of the disclosure is provided to enable understanding of the disclosure. Various modifications to the disclosure will be apparent, and the universal principles defined herein can be applied to other variants without departing from the spirit or scope of the disclosure. Therefore, this disclosure is not intended to be limited to the examples and designs described herein, but should be granted the widest scope consistent with the principles and novel features disclosed herein.

What is claimed is:

1. A processing method for rear view image, comprising following steps:
   obtaining an original rear view image;
   obtaining vehicle data to determine at least one basic curvature;
   obtaining driver information to determine at least one floating curvature; and
   processing the rear view image according to the at least one basic curvature and the at least one floating curvature.

2. The processing method according to claim 1, wherein before determining the basic curvature and/or the floating curvature, the processing method further comprises following steps:
   dividing the rear view image into a plurality of display areas according to a display position.

3. The processing method according to claim 2, wherein the step of obtaining vehicle data to determine at least one basic curvature comprises: obtaining vehicle data, and determining a basic curvature for each of the display areas according to the vehicle data, and/or
   the step of obtaining driver information to determine at least one floating curvature comprises: obtaining driver information, and determining a floating curvature for each of the display areas according to the driver information.

4. The processing method according to claim 3, wherein the vehicle data comprises at least one of gear data, steering data and speed data, and/or
   the driver information comprises at least one of face ID, age information and eye position data.

5. The processing method according to claim 4, wherein the steps of obtaining vehicle data, and determining a basic curvature for each of the display areas according to the vehicle data comprises:
   obtaining gear data and the speed data of the vehicle; and
   in response to the gear data and the speed data indicating that the vehicle is in a forward gear and vehicle speed is less than a preset speed threshold, configuring a smaller first basic curvature for a near end display area next to the vehicle, and configuring a larger second basic curvature for a far end display area away from the vehicle.

6. The processing method according to claim 5, wherein the steps of obtaining vehicle data, and determining a basic curvature for each of the display areas according to the vehicle data further comprises:
   in response to the gear data and the speed data indicating that the vehicle is in the forward gear and the vehicle speed is greater than or equal to the preset speed threshold, configuring a third basic curvature for the near end display area, and configuring a fourth basic curvature for the far end display area, wherein the third basic curvature is greater than the first basic curvature, and the fourth basic curvature is greater than the second basic curvature.

7. The processing method according to claim 4, wherein the steps of obtaining vehicle data, and determining a basic curvature for each of the display areas according to the vehicle data comprises:
   obtaining the gear data of the vehicle; and
   in response to the gear data indicating that the vehicle is in a reverse gear, configuring a basic curvature that equals zero for a lower display area that faces underside of the vehicle, and configuring a fifth basic curvature that is greater than zero for a middle-upper display area that faces rear and/or upside of the vehicle.

8. The processing method according to claim 4, wherein the steps of obtaining driver information, and determining a floating curvature for each of the display areas according to the driver information comprises:
  obtaining the eye position data of the driver; and
  configuring a larger first floating curvature for a focus area corresponding to the eye position data, and configuring a smaller second floating curvature for a rest non focus area.

9. The processing method according to claim 4, wherein the steps of obtaining driver information, and determining a floating curvature for each of the display areas according to the driver information comprises:
  obtaining a face ID of the driver;
  obtaining a personalized setting parameter of floating curvature of the driver according to the face ID; and
  determining a third floating curvature corresponding to each of the display areas according to the personalized setting parameter.

10. The processing method according to claim 9, wherein the steps of obtaining driver information, and determining a floating curvature for each of the display areas according to the driver information further comprises:
  obtaining the age information of the driver according to the face ID;
  in response to the age of the driver being greater than or equal to a preset age threshold, determining a larger fourth floating curvature for each of the display areas; and
  in response to the age of the driver being less than the age threshold, determining a smaller fifth floating curvature for each of the display areas.

11. The processing method according to claim 3, wherein the steps of processing the rear view image according to the at least one basic curvature and the at least one floating curvature comprises:
  summing each of the basic curvatures and the corresponding floating curvature thereof to determine a plurality of comprehensive curvatures;
  determining a plurality of surface control points according to the plurality of comprehensive curvatures; and
  processing the rear view image according to the plurality of surface control points to obtain a corresponding Bezier surface image.

12. The processing method according to claim 1, further comprising following steps:
  displaying the processed rear view image on a rear view display interface, wherein the rear view display interface is selected from at least one of central control display, electronic rearview minor and mobile user terminal of the vehicle.

13. A processing device for rear view image, comprising:
  a memory; and
  a processor, wherein the processor is connected to the memory and configured to implement the processing method of the rear view image according to claim 1.

14. The processing device according to claim 13, further comprising:
  a rear view display interface, used to display a processed rear view image, wherein the rear view display interface is selected from at least one of central control display, electronic rearview minor and mobile user terminal of a vehicle.

15. A non-transitory computer-readable storage medium, in which computer instructions are stored, wherein when the computer instructions are executed by a processor, the processing method for rear view image according to claim 1 is implemented.

* * * * *